United States Patent

Bobik et al.

[11] Patent Number: 5,587,138
[45] Date of Patent: Dec. 24, 1996

[54] PROCESS FOR PREVENTING THE FORMATION OF HARMFUL ORGANIC SUBSTANCES AND STEAM GENERATOR FOR CARRYING OUT THE PROCESS

[75] Inventors: Michael Bobik; Ralf L. Lindbauer, both of Graz; Alfred Glasner, Passail, all of Austria

[73] Assignee: Austrian Energy & Environment, SGP/Waagner-Biro GmbH, Vienna, Austria

[21] Appl. No.: 422,549

[22] Filed: Apr. 13, 1995

Related U.S. Application Data

[63] Continuation-in-part of Ser. No. 87,722, Jul. 7, 1993, abandoned.

Foreign Application Priority Data

Dec. 18, 1991 [AT] Austria ................................. 2504/91

[51] Int. Cl.$^6$ ............................................. C01B 17/00
[52] U.S. Cl. ................................. 423/242.1; 423/240 S; 423/245.3; 95/132; 95/142
[58] Field of Search ............................. 423/242.1, 240 S, 423/245.3; 95/132, 142; 208/262.1; 110/346

[56] References Cited

U.S. PATENT DOCUMENTS

| | | | |
|---|---|---|---|
| 4,220,478 | 9/1980 | Schuff | 106/281 R |
| 4,533,364 | 8/1985 | Altman et al. | 55/5 |
| 4,681,045 | 7/1987 | Dvirka et al. | 110/345 |
| 4,793,270 | 12/1988 | Karasek et al. | 110/344 |
| 4,829,911 | 5/1989 | Nielson | 110/234 |
| 5,011,516 | 4/1991 | Altman et al. | 55/5 |
| 5,240,470 | 8/1993 | Wright | 95/58 |
| 5,261,931 | 11/1993 | Wright | 95/3 |

*Primary Examiner*—Michael Lewis
*Assistant Examiner*—Amy M. Harding
*Attorney, Agent, or Firm*—Steinberg, Raskin & Davidson, P.C.

[57] ABSTRACT

The present invention is directed to a process for preventing the formation of dioxin and/or furan during combustion of composite combustible materials in a combustion chamber. The process includes passing the generated combustion gas in a flow from the combustion chamber to a dedusting device, cooled and purified while maintaining the $SO_3$ content in the combustion gas flow from about 7 to about 500 mg/m$^3$ and at a temperature of from about 300° to about 800° C., The process allows at least surface regions of particles of meal dusts contained in the combustion gas to be converted to sulfates and thereby prevent formation of dioxins and furan. The invention also includes a steam generator for carrying out the process whose steel structures coming into contact with the combustion gases are either alloyed or coated with tungsten and/or vanadium on the combustion-gas side.

17 Claims, No Drawings

PROCESS FOR PREVENTING THE FORMATION OF HARMFUL ORGANIC SUBSTANCES AND STEAM GENERATOR FOR CARRYING OUT THE PROCESS

CROSS-REFERENCE TO RELATED APPLICATIONS

This application is a continuation-in-part of U.S. Pat. No. 08/087,722 filed Jul. 7, 1993 now abandoned.

BACKGROUND OF THE INVENTION

1. Field of the Invention

The present invention relates to a process for preventing the formation of harmful organic substances from organic building blocks. In particular, the invention relates to preventing the formation of dioxin and furan in the combustion of composite cobustible materials such as household, industrial, special or hazardous waste materials. The combustion occurs in a combustion chamber with the cooling and purification of the combustion gas occurring at the combustion-gas side. The invention also includes a steam generator for carrying out the process.

2. Description of the Prior Art

It is known that in the combustion of sulfur, $SO_2$ and $SO_3$ are formed in a particular ratio. In the incineration of waste, maximal $SO_3$ levels emitted reach about 7 mg/m³.

It is also known (ATP 392,912 or 392,913) that in order to decrease the dioxin formation in the waste gas, $SO_2$ can be fed to the combustion waste gas directly or indirectly through the additional combustion of sulfur-containing combustible materials (i.e., sulfur-containing waste materials). This suggestion, however, yields only a partial success even if relatively large amounts of sulfur are added since the dioxin content in the filter dust practically does not change. The filter dust includes metals such as copper, strontium, lead, iron, etc. with catalytic capabilities wherein the copper in combination with chlorine play a special role. See, for example, equations 1–4 below:

1) $2CuO+4HCl=2CuCl_2+2H_2O$

2) $2CuCl_2=2CuCl+Cl_2$

3) $2CuCl+\frac{1}{2} O_2=Cu_2OCl_2$

4) $Cu_2OCl_2+2HCl=2CuCl_2+H_2O$

From these equations, it is evident that copper, through numerous conversions, can convert the combustion product HCl to chlorine and, in this way, exerts a catalytic effect for the (new) formation of PCDD/F. The chlorine generated (equation 2) combines with carbon compounds, aromatic compounds, and soot (i.e., non-burned residue) and forms chlorinated carbon compounds which include, among others, dioxins and furan.

The filter dust of waste material combustion installations contains approximately 0.1% copper and often more than 10% carbon. Thus, it must be taken into consideration that a major part of the metals being released in the combustion are eliminated with the slag or the combustion chamber ash in the combustion chamber free of dioxin.

SUMMARY OF THE INVENTION

The present invention includes a process for preventing the formation of dioxins and furan from organic building blocks during the combustion of composite combustible materials in a combustion chamber. In this environment, combustion gas containing $SO_2$ is formed and the combustion gas is passed in a flow from the combustion chamber to a dedusting device, cooled, and purified. The process includes maintaining the $SO_3$ content in the combustion gas flow from about 7 to about 500 mg/m³ while the temperature of the combustion gas flow is from about 300° to about 800° C. until at least surface regions of particles of metal dusts contained in the combustion gas are converted to sulfates and thus prevent formation of dioxins and furan. Preferably, the temperature is maintained in the range of from about 450° to 600° C.

The desired $SO_3$ content is preferably maintained by adding $SO_3$ or $SO_3$-generating sulfur-containing materials. The process also cart include adding oxidizing agents or catalysts during the combustion of the composite combustile materials.

In one preferred aspect of the invention, the $SO_3$ content in the combustion gas is maintained at a level of the about 100 to about 150 mg/m³. In alternative aspects of the invention, the $SO_3$ content in the combustion gas flow is maintained at a level of at least 200 mg/m³ and preferably at a level of at least of about 300 mg/m³ or even at least about 400 mg/m³. Furthermore, the process of the present invention can be carried out in a fluidized bed.

The invention also includes a steam generating incineration boiler for the carrying out the process described herein. The boiler includes a steam generator having a portion thereof formed by a steel alloyed with or coated with tungsten, vanadium or mixtures thereof.

As a result of the present invention, it has been found that by adding $SO_3$ beyond the chemical equilibrium point between $SO_3$ and $SO_2$, a dramatic reduction of dioxins and furan is achieved during the combustion, i.e., to levels below legal maximum in waste gas or nanogram/m³ of waste gas. Such low levels could not be achieved merely by adding $SO_2$ even in amounts of up to 800 mg/m³ or by adding higher sulfur fuel. Furthermore, since $SO_3$ adheres to the alkaline filter dust, no increase of $SO_3$ is observed in the clean flue gas after dust control and, consequently, no corrosion is found. Thus, substantial savings can be expected by using the novel method in, the example, retrofitting existing waste treatment plants.

DETAILED DESCRIPTION OF THE INVENTION

The present invention is based on preventing the release of chlorine in filter dust of waste material combustion installations and rendering catalytic metals inert through sulphatizing so that metal/chlorine compounds are avoided (i.e. $CuO+SO_3=CuSO_4$). The invention is further characterized in that before freeing the combustion gas from the dust, the $SO_3$ content is increased and maintained at levels of from about 7 to about 500 mg/m³ while maintaining the temperature of the combustion gas from about 300° to about 800° C. Preferably, the $SO_3$ content is maintained at a level of from about 100 to about 150 mg/m³ and the temperature of the combustion gas flow is from about 450° to about 600° C. In alternative aspects of the invention, the $SO_3$ levels of the combustion gas flow are maintained at levels of at least about 200 mg/m³, preferably at least about 300 mg/m³ and most preferably at least about 400 mg/m³. The temperature of the combustion gas in these alternative aspects is also from about 300° to about 800° C. and preferably from about 450° to about 600° C.

In each of the foregoing aspects, the combination of maintaining the $SO_3$ content and temperature of the combustion gas flow provides an environment which allows the surface regions of metal dust particles, in particular, heavy metal dusts such as preferably copper dusts, contained in the combustion gas flow, to be converted in the great degree to sulfates and thereby prevent formation of dioxins and furan.

The combustion gas is preferably supplied with $SO_3$ or $SO_3$-generating sulfur-containing materials such as sulfuric acid, or sulfates (for example, $Na_2SO_4+H_2O=2\ NaHSO_4$). In addition, oxidizing agents or catalysts for the conversion of $SO_2$ into $SO_3$ can be added to the combustion or to the combustion gas at temperatures of more than 150° C. and preferably at the temperatures described above, i.e., 300°–800° C. and preferably 450°–600° C.

The process of the present invention can also include the steps of providing a source of $SO_3$ or producing $SO_3$ by adding catalysts to the sulfur-containing materials or providing for the thermal dissolution of sulfates in the sulfur-containing materials. The $SO_3$ is added to the combustion chamber and/or the combustion gas, and the ratio of the $SO_2/SO_3$ is shifted in the direction towards the production of more $SO_3$ to bind heavy metal dust particles in sulfate form.

In a preferred embodiment, the combustion gas is passed from the combustion chamber through a combustion gas channel to the dedusting device and one or more of $SO_3$, sulfur-containing materials, oxidizing agents, and/or catalysts are added to the combustion gas at several locations in the combustion gas channel. Also, the $SO_3$ can be generated prior to the addition of the sulfur-containing materials, oxidizing agents or catalysts to the combustion chamber and/or to the combustion gas. In the embodiment where sulfur-containing materials are added to the combustible material, the products of the combustion reaction can be lead to a higher sulfate formation on the dust surface of the raw gas dust as a result of the specified content of $SO_3$ in the combustion gas.

The process of the present invention also contemplates that the combustion can occur in a fluidized bed. The process can thus include the step of introducing $SO_3$ or an $SO_3$-generating material and/or catalytic substances into the fluidized bed to enhance the conversion of sulfur in the combustible material to $SO_3$ and maintaining the desired $SO_3$ levels to prevent dioxin and furan formation.

In a further aspect of the invention, it is also possible to introduce catalytic substances into the combustible material to stimulate the formation of $SO_3$ from $SO_2$ and/or add tungsten, vanadium, compounds thereof and mixtures thereof to the combustible material. The tungsten, vanadium or compounds thereof can be in solid, liquid or pasty form, and are preferably in the form of waste oils containing vanadium.

In the embodiment of the invention where the desired $SO_3$ levels are maintained by oxidizing $SO_2$ into $SO_3$, the process may include the step of adding chemicals to the combustion gas to support the oxidation of $SO_2$ to $SO_3$. The chemicals may be oxidizing agents selected from the group consisting of $O_2$, peroxides, permanganates, peroxodisulfates, ozone, oxidizing radicals, oxidizing radical stimulating substances, thermally decomposing powders, crystals, $Ca(OH)_2$, $NaHCO_3$, and alkali hydroxides.

The steam generators of the present invention are formed, at least in part, with steels which are at least partially alloyed or coated with tungsten and/or vanadium. In particular, the effective heating surfaces of the device are arranged so that the steel parts which contact the combustion gases at least between the combustion chamber and the dedusting device are formed from steels alloyed or coated with tungsten or vanadium and thus provide a source of catalyst.

In terms of construction, this process can also be carried out with a steam generator whose pipes or effective heating surfaces beginning in the combustion chamber to the dust separator are formed by a steel comprising or coated with tungsten and/or vanadium and thereby the steam generator itself is implemented as a catalyst. Especially suitable for this purpose are the succeeding effective heating surfaces outside of the combustion chamber and preceding the dedusting in the temperature range of 300° to 800° C.

The invention also addresses another problem of the insidious increased generation of harmful substances such as dioxin and furan with increasing degree of contamination of the effective heating surfaces around which stream combustion gases. Since sulphatizing is chemically preferred over chlorination, the metals in the flu dust are very rapidly sulphatized so that the effective chlorine formation from the deposits or from HCl via the metals comes to a standstill, and thereby the formation of dioxin or furan is decreased. In other words, the contamination of the effective heating surfaces no longer proceeds parallel to the formation of dioxin.

The invention also resides in part in the increase of and maintaining of $SO_3$ content in the combustion gases to between 7 and 500 mg/m$^3$. As stated above, in one aspect of the invention, $SO_3$ levels of from at least about 100 to 150 mg/m$^3$ are maintained and in other aspects, the $SO_3$ levels are maintained at levels of at least about 200 mg/m$^3$, preferably at least about 300 mg/m$^3$, and most preferably at levels of at least about 400 mg/m$^3$. The $SO_3$ can be introduced or blown in from corresponding $SO_3$ generation installations into the waste gas. Preferably the $SO_3$, is blown into a combustion chamber or at several sites between the combustion chamber and the dedusting device at a combustion gas temperature of more than 150° C., preferably at temperatures of from about 300° to about 800° C. and more preferably at temperatures of from about 450° to about 600° C. It is to be understood that once the surface regions of the metal dusts contained in the combustion gas are converted to sulfates, the temperature of combustion gas can be lowered, eventually to temperatures below around 250° C. so that the gas can be passed through an electrostatic precipitator, if desired.

It is also potentially possible to combust sulfuric acid, such as, for example, dilute or waste sulfuric acid, together with the combustible material to obtain the desired $SO_3$ levels. For example, the sulfuric acid can be introduced or blown into the combustion air at one or several sites. Since the sulfur oxides are harmful substances, which in practice, are bound to lime, it is useful in those situations where sufficient $SO_2$ is present to avoid additional sulfur oxide additions. The inventive process can also be carried out through the addition of oxidizing agents, such as oxygen, ozone, chromium-VI compounds, per-compounds such as, for example, peroxides, permanganates, and peroxodisulfates, and radical or radical-stimulating substances or catalysts in the combustion chamber or by forming the combustion chamber or succeeding parts as catalysts so that a major portion of the oxidized sulfur is present as $SO_3$, although the total quantity of sulfur in the waste gas ($SO_2+SO_3$), remains constant and no additional binding agents such as lime are required.

If a portion of the lime is already introduced into the combustion chamber in the form of $(CaOH)_2$, for which a fluidized bed combustion is especially well suited, oxidizing agents or radicals are generated which convert the $SO_2$ into $SO_3$ and thereby provide the desired $SO_3$ levels. However, it must be observed that here, relative to the chlorine, a large number of sulfur oxides must be present since the calcium binds sulfur compounds and a minimum Cl/S ratio must be maintained. A similar effect is achieved through the combustion of vanadium or tungsten-containing waste oils whose content of heavy metals (tungsten or vanadium) acts like a catalyst in such a way that increased $SO_3$ conversion takes place and thereby, the disposal problems of waste oils is solved. The problem of the consumed catalysts can also be eliminated in that consumed SCR catalysts of Denox installations from power station boilers, which contain tungsten and vanadium, are introduced into the combustion in a finely ground form. The heavy metal components, primarily tungsten and vanadium, as in the addition of waste oils, supports the catalytic $SO_3$ formation. It is, however, a basic requirement that the sulfur/chlorine ratio in the waste gases such as described in, for example, in ATP 392,912 and ATP 392,913 is increased. In these patents, the dioxin formation in the gaseous phase is hardly influenced due to the low $SO_3$ content which, in general, is under 7 mg/m³ in combustion gas in normal waste gases of waste incinerations. This sulfur load is too low for the sufficient sulphatizing of metal particles in the dust.

While there have been described what are presently believed to be the preferred embodiments of the invention, those skilled in the art will realize that changes and modifications may be made thereto without departing from the spirit of the invention, and it is intended to claim all such changes and modifications that tall within the true scope of the invention.

What is claimed is:

1. A process for minimizing the formation of dioxins and furan from organic building blocks during combustion of composite combustible materials in a combustion chamber during which combustion gas containing $SO_2$ is formed and, wherein the combustion gas is passed in a flow from the combustion chamber to a dedusting device, cooled and purified, comprising increasing the $SO_3$ content in the combustion gas flow to a value in the range of between about 75 mg/m³ to about 500 mg/m³ during the period that the combustion gas flow is from about 300° to about 800° C. until at least surface regions of particles of metal dusts contained in the combustion gas are convened to sulfates to thereby minimize formation of dioxins and furan.

2. The process of claim 1, wherein said $SO_3$ content is increased by adding $SO_3$ or a $SO_3$-generating sulfer-containing material.

3. The process of claim 2, further comprising adding oxidizing agents or catalysts during the combustion of said composite combustible materials.

4. The process of claim 2, wherein said $SO_3$-generating sulfur containing material is sulfuric acid.

5. The process of claim 1, wherein the $SO_3$ content in said combustion gas is increased to from about 100 to about 150 mg/m³.

6. The process of claim 1, wherein the $SO_3$ content in said combustion gas is increased to at least about 200 mg/m³.

7. The process of claim 6, wherein the $SO_3$ content in said combustion gas is increased to at least about 300 mg/m³.

8. The process of claim 7, wherein the $SO_3$ content in said combustion gas is increased to at least about 400 mg/m³.

9. The process of claim 1, wherein a member selected from the group consisting of $O_2$, peroxides, permanganates, peroxodisulfates, oxidizing radicals, oxidizing radical-stimulating substances, $Ca(OH)_2$, $NaHCO_3$, alkali hydroxides and mixtures thereof is added during the combustion of said composite combustible materials.

10. The process of claim 1, further comprising adding a member of the group consisting of tungsten, vanadium and mixtures thereof during the combustion of said composite combustible material.

11. The process of claim 10, wherein said tungsten and vanadium are in finely ground form.

12. The process of claim 1, wherein said combustion of said composite combustible materials occurs in a fluidized bed.

13. The process of claim 1, further comprising carrying out said combustion of said composite combustible materials in a chamber containing heating surfaces formed by a steel comprising or coated with tungsten, vanadium or mixtures thereof.

14. The process of claim 1, wherein said temperature is from about 450° to about 600° C.

15. The process of claim 1, wherein the $SO_3$ content in said combustion gas is from about 100 to about 500 mg/m³.

16. The process of claim 1, further comprising carrying out said combustion of said composite combustible materials in a steam generator having a portion thereof formed by a steel alloyed with or coated with tungsten, vanadium or mixtures thereof.

17. The process of claim 16, wherein said steam generator further comprises a dedusting device and the surfaces between the combustion chamber of said steam generator and said dedusting device are formed by steel alloyed with or coated with tungsten, vanadium or mixtures thereof.

\* \* \* \* \*